June 9, 1942.    J. F. SLADKY    2,286,016
SIGNAL HORN SWITCH
Filed July 24, 1940    2 Sheets-Sheet 1
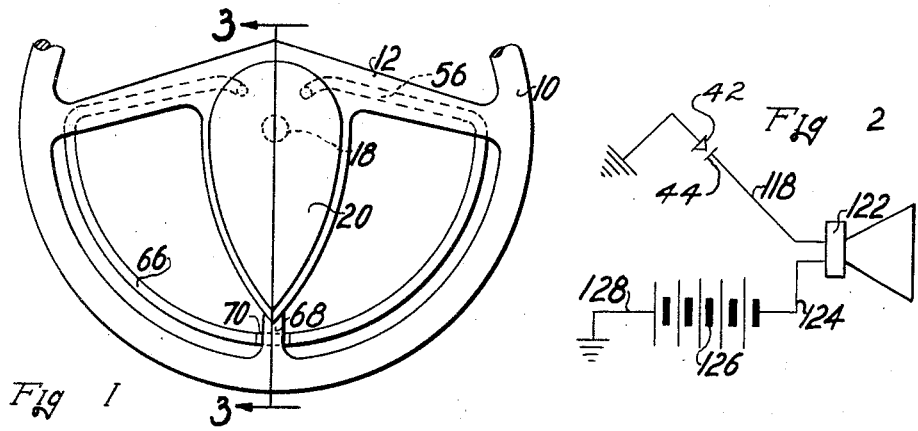
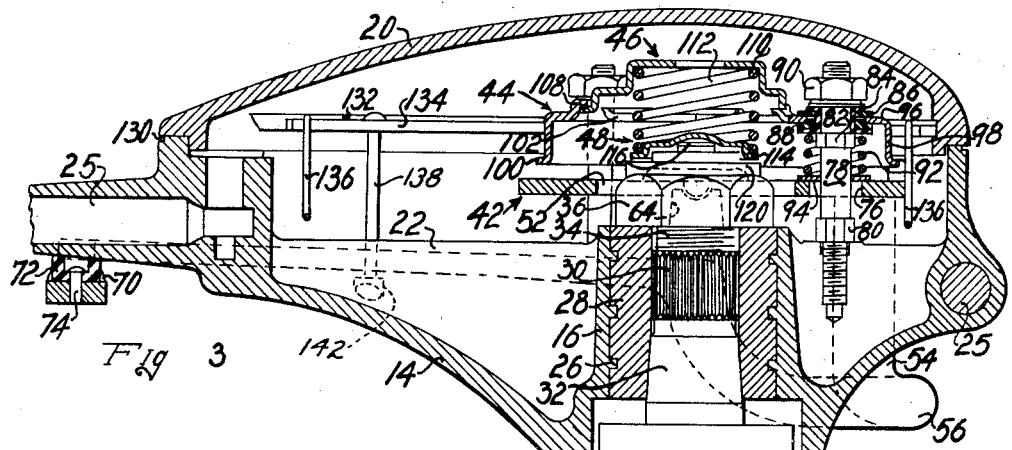
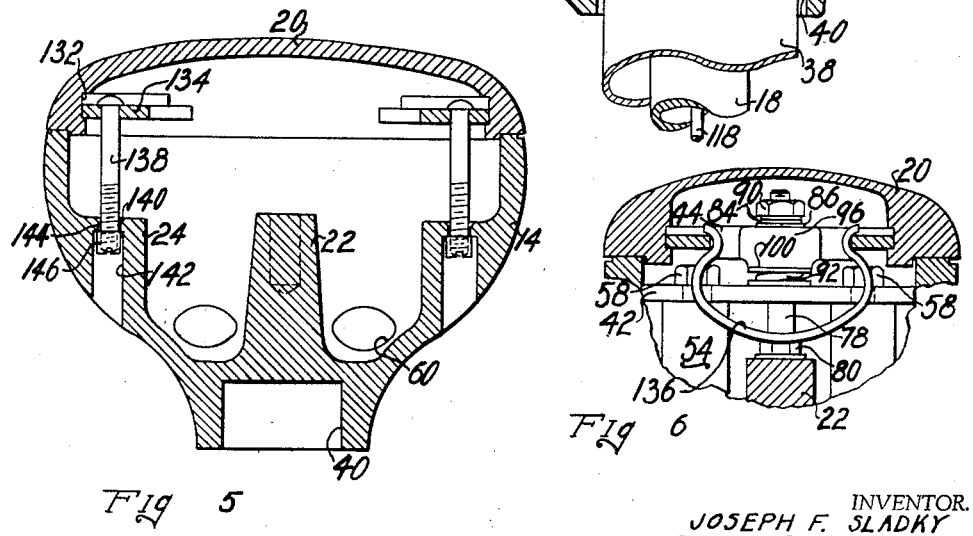
INVENTOR.
JOSEPH F. SLADKY
BY
Carl J. Barker
his ATTORNEY.

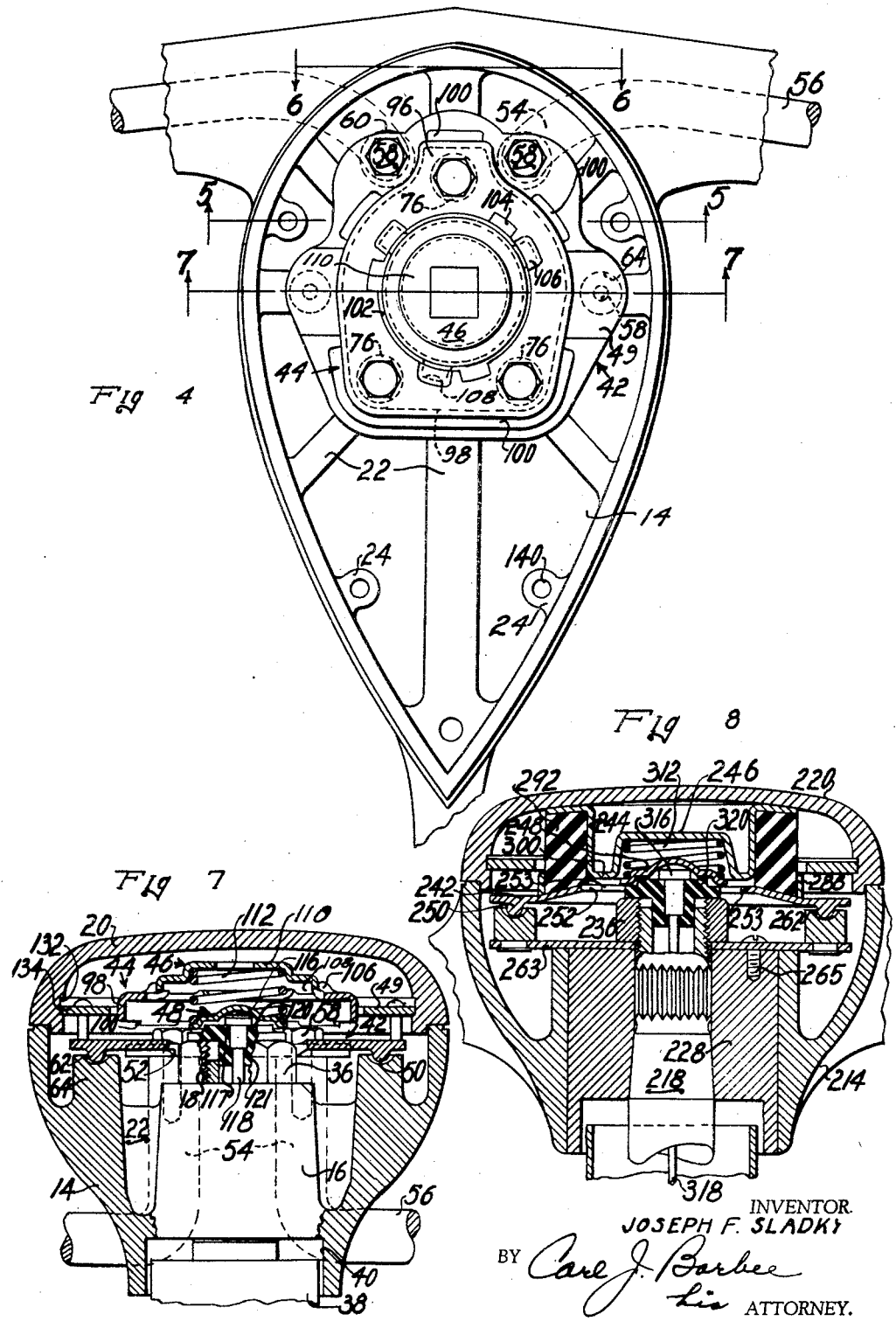

Patented June 9, 1942

2,286,016

UNITED STATES PATENT OFFICE 2,286,016

SIGNAL HORN SWITCH

Joseph F. Sladky, Racine, Wis., assignor to Nash-Kelvinator Corporation, Kenosha, Wis., a corporation of Maryland Application July 24, 1940, Serial No. 347,220

12 Claims. (Cl. 200—59)

The invention relates to signal switches and has particular reference to a horn switch arranged to be mounted on a steering wheel.

It is an object of this invention to provide a horn switch assembly which may be assembled on a steering wheel and tested before the wheel is mounted on the steering shaft of an automobile.

It is another object of this invention to provide a horn switch operable from a ring positioned underneath the steering wheel.

It is another object of this invention to provide a horn switch, the operating tension of which may be adjusted.

It is another object of this invention to provide a horn switch in which the contact members are of rigid construction.

Other objects and advantages of this invention will be apparent from a consideration of the following description and claims and the attached drawings of which there are two sheets and in which—

Figure 1 represents a plan view of an automotive steering wheel, horn button, and ring;

Figure 2 represents a schematic wiring diagram of the horn circuit;

Figure 3 represents a section taken along a plane indicated by the line 3—3 in Figure 1 and looking in the direction of the arrows;

Figure 4 represents a plan view of the hub of the steering wheel with the cover removed;

Figure 5 represents a sectional view taken along a plane indicated by the line 5—5 in Figure 4 and looking in the direction of the arrows;

Figure 6 represents a sectional view taken along a plane indicated by the line 6—6 in Figure 4 and looking in the direction of the arrows;

Figure 7 represents a sectional view taken along a plane indicated by the line 7—7 in Figure 4 and looking in the direction of the arrows; and, Figure 8 represents a sectional view similar to Figure 7 but illustrating a modified type of construction.

Illustrated in the drawings is a steering wheel 10 having spokes 12 and a base 14 within which is formed a hub 16 mounted on the steering shaft 18. The base 14 is hollow and has an open top side closed by the cover 20. Formed integrally with the base 14 and hub 16 are a series of vertical flanges 22 and bosses 24. The base 14 may be conveniently manufactured as a die casting and has the strengthening cores 25 of the spokes 12 cast therein.

The hub 16 is provided with a series of vertically spaced annular ribs 26 formed on the inside surface thereof, which ribs engage grooves cut in a sleeve 28. Sleeve 28 is made of metal and is placed in the die when the hub 16 and base 14 is cast so as to be integral with the base. Hub 16 and sleeve 28 are positioned over the end of the steering shaft 18, and the inside of the sleeve 28 engages the vertical serrations 30 and the tapered portion 32 formed on the end of the steering shaft 18. The end of the shaft is threaded at 34 to receive the nut 36. By tightening down the nut 36 against the upper end of the sleeve 28, the sleeve is clamped tightly between the tapered portion 32 of the shaft 18 and the nut 36. The base 14 and wheel 10 are thus firmly connected to the steering shaft 18 which is grounded to the frame of the automobile through the steering gear (not shown). The shaft 18 is enclosed in the steering column 38, the upper end of which extends into the recess 40 formed on the lower surface of the base 14.

The horn switch secured to the base 14 consists generally of a movable contact plate 42, a fixed contact plate 44, a cap 46, a button 48. Movable plate 42 is provided with a transverse raised portion 49 from the underside of which projects a pair of pivot points 50, (see Figures 4 and 7). The plate 42 is apertured at 52 and has secured to its forward edge the upturned ends 54 of the horn ring 56. The ring 56 is fastened to the plate by means of cap screws 58 passed through the plate 42 and threaded into holes in the raised ends 54.

The raised ends 54 of the horn ring 56 project upwardly through holes 60 formed in the forward portion of the base 14. The pivot pins 50 in the center of the plate 42 are supported in the depressions 62 formed in the top of bosses 64 rising above the flanges 22. The aperture 52 allows the nut 36 to project through the plate 42.

After the ends 54 are carried downwardly through the holes 60, the horn ring 56 is bent to the rim of the wheel 10 underneath to the spkokes 12 and then bent in a ring portion 66 just within the diameter of the wheel rim 10 where it may be conveniently reached by the driver of the car. Where the rim 66 of the horn ring 56 passes under the lower spoke 68 of the wheel 10, it is bent down in a general U-shaped notch 70 at the bottom of which the rubber bumper 72 is secured by means of a rivet 74.

Plate 42 is provided with three triangularly spaced apertures 76 through which project the bolts 78. Bolts 78 are supported in the flanges 22 and are secured in place by lock nuts 80.

Threaded on the upper ends of the bolts 78 (see Figure 3) are supporting nuts 82 on which rest the flanged rubber sleeves 84. Retained between the flanges of the rubber sleeves 84 are flat fiber washers 86 and shouldered fiber washers 88. Shouldered washers 88 are fitted into apertures formed in stationary contact plate 44 and support the contact plate 44 upon the rubber sleeves 84 and supporting nuts 82. Nuts 90 secured on the upper end of the bolts 78 press the fiber washers 86 against the lower washers 88 to retain the plate 44 in place. Plate 44 is thus rigidly supported above the base 14 and above the movable plate 42 but insulated electrically from each of these members by the rubber sleeves 84 and the fiber washers 86 and 88.

Positioned around the forward bolt 78 and between the rubber sleeve 84 and the movable plate 42 is coil spring 92. Spring 92 is located forwardly of a line between the pivot pins 50 of plate 42 and so is constantly urging plate 42 and the attached horn ring 66 to tip downwardly in the front and upwardly at its rear portion where the rubber bumper 72 limits the upward movement by engaging the bottom spoke 68. A washer 94 is provided between the spring 92 and the plate 42.

Stationary contact plate 44, which is supported as just described, is generally rectangular in shape but with a forwardly projecting portion 96 which extends between the bolts 58 securing the horn ring 56 to the plate 42. Forwardly projecting portion 96 also receives and is secured to the forward bolt 78, thus moving the support and spring 92 forwardly of the general rectangular portion of the plate 44. Plate 44 is provided on all sides with a downwardly bent flange 98. The downwardly bent flange 98 is bent outwardly into a series of contact flanges 100. The flanges 100 are supported just above the movable contact plate 42, and when the movable plate 42 is tipped as by pressure applied to the rim 66 of the horn ring 56, the movable plate 42 will contact one of the contact flanges 100.

The plate 44 is apertured at 102 just over the nut 36, and the aperture 102 is provided with a series of radial slots 104 and a series of upwardly pressed notches 106. Slots 104 are arranged to pass the radial tongues 108 formed around the circular cap 46. By pressing the tongues 108 through the slots 104 and rotating the cap 46, the tongues 108 may be made to register with the under side of the notches 106 to prevent rotation or upward movement of the cap 46. Cap 46 is provided with a raised dome 110, the walls of which serve to center a coil spring 112. The lower end of spring 112 rests on the shouldered edge 114 of the metal button 48. Button 48 rests on the metal tip 116 of an insulated wire 118 which is carried up through the center of the steering shaft 18. The metal tip 116 is shouldered (see Figure 7) at 117 and insulating button 120, which has a hub portion 121 extending into the shaft 18 and which insulates tip 116 and the metal button 48 from the nut 36 and the steering shaft 18.

When the plate 42 is tilted to make contact with the flanges 100 of plate 44, as explained above, a circuit will be completed from the base 14 of the wheel 10 through the pivot points 50, through plate 42, fixed plate 44, cap 46, coil spring 112, metal button 48, metal tip 116 to the insulated wire 118. Wire 118 is connected (see Figure 2) to the horn 122, and horn 122 is connected by wire 124 to one side of the battery 126. The grounded side 128 of the battery completes the circuit through the horn.

Attention is called to the fact that the rim 66 of the horn ring 56 may be pressed or lifted at any point to close the horn circuit.

Movable plate 42 and horn ring 66 are supported only at the two pivot points 50. Any vertical pressure applied to the ring 56 will cause the plate 42 to tip about one or both of the pivot points 50 into contact with one of the flanges 100 of the fixed plate 44. Further, the resistance of the plate 42 against tipping may be adjusted by moving the supporting nut 82 on the forward bolt 78 to change the compression of spring 92.

Attention is called to the fact that the raised ends 54 of the ring 56 may be fitted into the holes 60 and attached to the plate 42 which is positioned on the bosses 64, and the bolts 78 may be passed through the apertures 76 in plate 42 and secured in the flanges 22. The fixed plate 44 may be secured on the upper ends of the bolts 78 as has been described, and the cap 46 installed and the horn switch tested before the wheel 10 is installed in an automobile. All that is necessary in assembling the wheel to the automobile is to remove the cap 46 and spring 112 so that the nut 36, which holds the wheel to the steering shaft 18, may be installed and tightened through the aperture 102 in the fixed plate 44 and aperture 52 in the movable plate 42. Then the button 120, wire 118 and metal button 48 may be put in place, after which the spring 112 and cap 46 are pressed down so that the tongues 108 pass through the slots 104 after which the cap 46 is rotated to place the tongues under the notches 106, and the assembling is complete.

The top of the base 14 is flat so as to receive the flanged edge 130 of the cover 20. Cover 20 is provided along its inside edge with grooves 132 within which rest two bars 134. The bars 134 are pressed outwardly and retained in the grooves 132 by means of a pair of bow springs 136, one at each end of the cap 20, which press the bars into the grooves. The bars 134 are punched to receive the bolts 138 each. Bolts 138 extend downwardly through apertures 140 cut in the bosses 24. Bosses 24 are hollow as indicated at 142 in Figure 5 and have the shoulders 144 formed around apertures 140. Nuts 146 bear against the shoulders 144 to draw down the bolts 138. Bolts 138 in turn draw down the bars 134 and cover 20. It will be noted that the nuts 146 are well recessed in the hollow bosses leaving the base 14 free from any projections.

In the structure illustrated in Figure 8 the various parts have been numbered so far as possible with numbers 200 higher than the corresponding parts in the structure shown in Figures 1 to 7. Cupped blocks 262 are supported upon a plate 263 which is secured directly to the base 214 by the nut 236 which secures the steering shaft 218 in the sleeve 228. Plate 263 is further secured to the sleeve 228 by a series of screws 265. The movable contact plate 242 is supported upon the blocks 262 by a pair of pivot pins 250 in the same manner as is plate 42 in Figure 7. A fixed contact plate 244 is held against the cover 220 by means of a ring 292 of sponge rubber or some similar flexible insulating material. The lower edge of the ring 292 rests within an annular flange 288 carried on the movable plate 242. Fixed plate 244 is shaped to have a downwardly presented contact rim 300 and within the center of which is a raised spring retaining cap 246. Steering shaft 218 is the same shaft 18 in the first example of the invention and is provided with the same insulated wire 318, insulating button 320, metal tip 316 and metal button 248. Button 248 is electrically connected to the cap portion 246 by the coil spring 312 which also serves to hold the button 248 in place. Movable plate 242 is apertured at 252 to clear the nut 236 and allow the nut to be installed after the plate 242 is in place. The aperture 252 is provided with lugs 253 which may be tipped into contact with the contact portion 300 of the fixed plate 244. Plate 242 is connected to a horn ring shown in the same manner in which plate 42 is connected to the ring 56 in the first example of the invention. The sponge rubber 292 serves both as a flexing member against the spring of which the plate 242 is tipped and to retain the fixed plate 244 in place against the cover 220. Cover 220 is retained on the base 214 by the same means which holds cover 20 to base 14. The modified type of structure shown in Figure 8 replaces the coil spring 92 and bolts 78 in the first example with the sponge rubber 292.

While I have described my invention in some detail, I intend this description to be an example only, and not as a limitation of my invention to which I make the following claims:

1. In combination with a steering wheel having a base, a horn switch including a fixed plate and a movable plate mounted on top of said base, a horn ring positioned below said base and extending upwardly therethrough to said switch, and a pivot for said movable plate on said base.

2. In combination with a steering wheel having a base, a horn switch including a fixed plate and a movable plate mounted on top of said base, a horn ring positioned below said base and extending upwardly therethrough to said switch, and a pivot for said movable plate on said base, said plates being centrally apertured.

3. In combination with a steering wheel having a base, a spoke extending from said base, a horn ring positioned below said base and having a bumper portion under said spoke, legs on said ring extending upwardly through said base, a pair of supports on said base arranged on a line crossing the line of said spoke, a movable contact plate supported on said supports, means connecting said legs to said movable plate on the opposite side of said supports from said spoke, a fixed plate secured to said base and spaced from said supports, a spring positioned between said plates on the opposite side of said supports from said spoke and insulated from one of said plates, and means electrically connecting said plates in a horn circuit.

4. In combination with a steering wheel having a base, a horn ring positioned below said wheel and having ends projecting through said base, a plate secured to the ends of said ring and having pivots spaced from said ends, said pivots being supported on said base, a fixed plate positioned over said first plate and secured to said base, said fixed plate being electrically insulated from said base, means electrically connecting said fixed plate in a horn circuit.

5. In combination with a steering wheel having a hollow base, a hub formed within said base and adapted to receive a steering shaft, a movable contact plate having a line support within said base and defining an aperture over the center of said hub, a horn ring having a portion secured to said plate at a point spaced from said line of support of said plate, yielding means balancing said plate on said support, a steering shaft in said hub, a nut accessible through the aperture in said plate and securing said hub to said shaft, and a live contact member carried by said steering wheel in position to contact said movable plate as said plate is tipped about said support line.

6. In combination with a steering wheel having a hollow base, a hub formed within said base, supports carried on said base along a line, a movable contact plate supported on the supports in said base and defining an aperture over said hub, an annular flange carried on said plate around said aperture, a cylindrical member formed of deformable material mounted on said movable plate within said annular flange, a fixed contact member having a flange positioned on the top of said deformable member and having a downwardly opening cup-shaped portion within said deformable member, a metal tip connected to a battery and supported through the center of said hub and insulated therefrom, a metal button positioned on said metal tip and having a flange formed therearound, a coil spring positioned between the flange of said metal button and the cup-shaped portion of said fixed contact, and a cover for said hollow base, said cover engaging the flange of said fixed contact member to compress said coil spring and said deformable member.

7. In combination with a steering wheel having a hollow base, a hub formed within said base, a hollow steering shaft located within said hub, a nut for securing said shaft to said hub, a movable contact plate pivotally supported along a line on said base, said movable contact plate defining a central aperture and a series of apertures spaced around said central aperture, supporting bolts extending from said base through said series of apertures in said movable plate, a fixed contact plate secured to said supporting bolts above said movable plate, said fixed plate defining a notched aperture centrally thereof, a cap member having tongues thereon arranged to pass through the notches around the aperture in said fixed plate, a spring compressed between said cap member and said nut and removable with said cap member through the aperture in said fixed plate, and a horn ring having a portion thereof extending through said base and attached to said movable plate at a point spaced from the line of support of said plate.

8. In combination with a steering wheel having a hollow base, a cover for said hollow base and rigidly secured thereto, a movable contact plate pivotally supported within said base, a fixed contact member within said base, a cylinder of deformable material positioned between said movable plate and said fixed contact for balancing said movable plate and retaining said fixed contact against said cover, and a horn ring having a portion thereof extending through said base and secured to said movable plate.

9. In combination with a steering wheel having a hollow base, a steering shaft secured in said base by a nut, a movable plate pivoted on said base and defining an aperture centrally thereof, a fixed contact member having a downwardly presented cup-shaped portion, an electrically connected button having a flange therearound supported by said steering shaft and insulated therefrom, and a coil spring compressed between the flange of said button and the cup-shaped portion of said fixed contact, said cup-shaped portion and spring being removable to make the nut on said steering shaft accessible through the aperture in said movable plate.

10. In combination with the steering wheel having a hollow base, a movable contact plate pivotally supported in said base, a horn ring secured to said movable plate at a point offset from the support of said plate, said horn ring extending below said plate through a wall of said base and to a point on the opposite side of said support from the connection between said ring and said plate, and a yielding member balancing said ring and on its support.

11. In combination with a steering wheel having a hollow base, a movable contact plate pivotally supported in said base, a horn ring secured to said movable plate at a point offset from the support of said plate, said horn ring extending below said plate through a wall of said base and to a point on the opposite side of said support from the connection between said ring and said plate, and a yielding member balancing said ring and its support, the portion of said ring opposite its connection with said plate being arranged to abut against a spoke of said steering wheel.

12. In combination with a steering wheel having a hollow base, a hub portion formed in said base, a hollow steering column secured in said hub, a nut for securing said column to said hub, a pair of plates positioned in said base and defining apertures through which said nut is removable, one of said plates being fixed to said base, the other of said plates being tiltable into contact with the first of said plates, means insulating one of said plates from said base, a live contact supported by said nut and insulated therefrom, means connecting said insulated plate to said live contact, and means secured to said tiltable plate and extending outside of said base for moving said tiltable plate into contact with said fixed plate, said live contact forming part of a signaling circuit.

JOSEPH F. SLADKY.